United States Patent [19]

Carlson

[11] Patent Number: 4,632,067
[45] Date of Patent: Dec. 30, 1986

[54] VAPOR INJECTION DEVICE

[76] Inventor: Drexel T. Carlson, 2909 W. 93rd Street Ter., Leawood, Kans. 66206

[21] Appl. No.: 803,562

[22] Filed: Dec. 2, 1985

[51] Int. Cl.$^4$ .................................................. F02M 25/04
[52] U.S. Cl. .................................. 123/25 A; 123/25 B; 123/25 J
[58] Field of Search ............... 123/25 R, 25 A, 25 B, 123/25 P, 25 L, 25 J

[56] References Cited

U.S. PATENT DOCUMENTS

| | | | |
|---|---|---|---|
| 3,044,453 | 7/1962 | Hoffmann | 123/25 B |
| 4,027,630 | 6/1977 | Giardini | 123/25 P |
| 4,119,063 | 10/1978 | Lohberg | 123/25 L |
| 4,141,323 | 2/1979 | Hart | 123/25 B |
| 4,411,224 | 10/1983 | Goodman | 123/25 A |
| 4,459,943 | 7/1984 | Goodman | 123/25 A |
| 4,557,222 | 12/1985 | Nelson | 123/25 B |

Primary Examiner—Ira S. Lazarus
Attorney, Agent, or Firm—Thomas M. Scofield

[57] ABSTRACT

A vapor generating and injection device for internal combustion engines; a vapor generating and injection system and device for vehicle engine systems having a turbo air compressor on the air intake line running from the air cleaner to the engine intake manifold; a vapor injection and generation system and device for internal combustion engines where there is available a supplemental pressurized air source such as a vehicle air brake system, a pollution control air pump, an exhaust manifold pressure tap, an air horn supply system, an add-on compressor or the like; vapor generating and injection devices for humidifying (by vapor only) the air supply for combustion to the cylinders of internal combustion engines.

8 Claims, 3 Drawing Figures

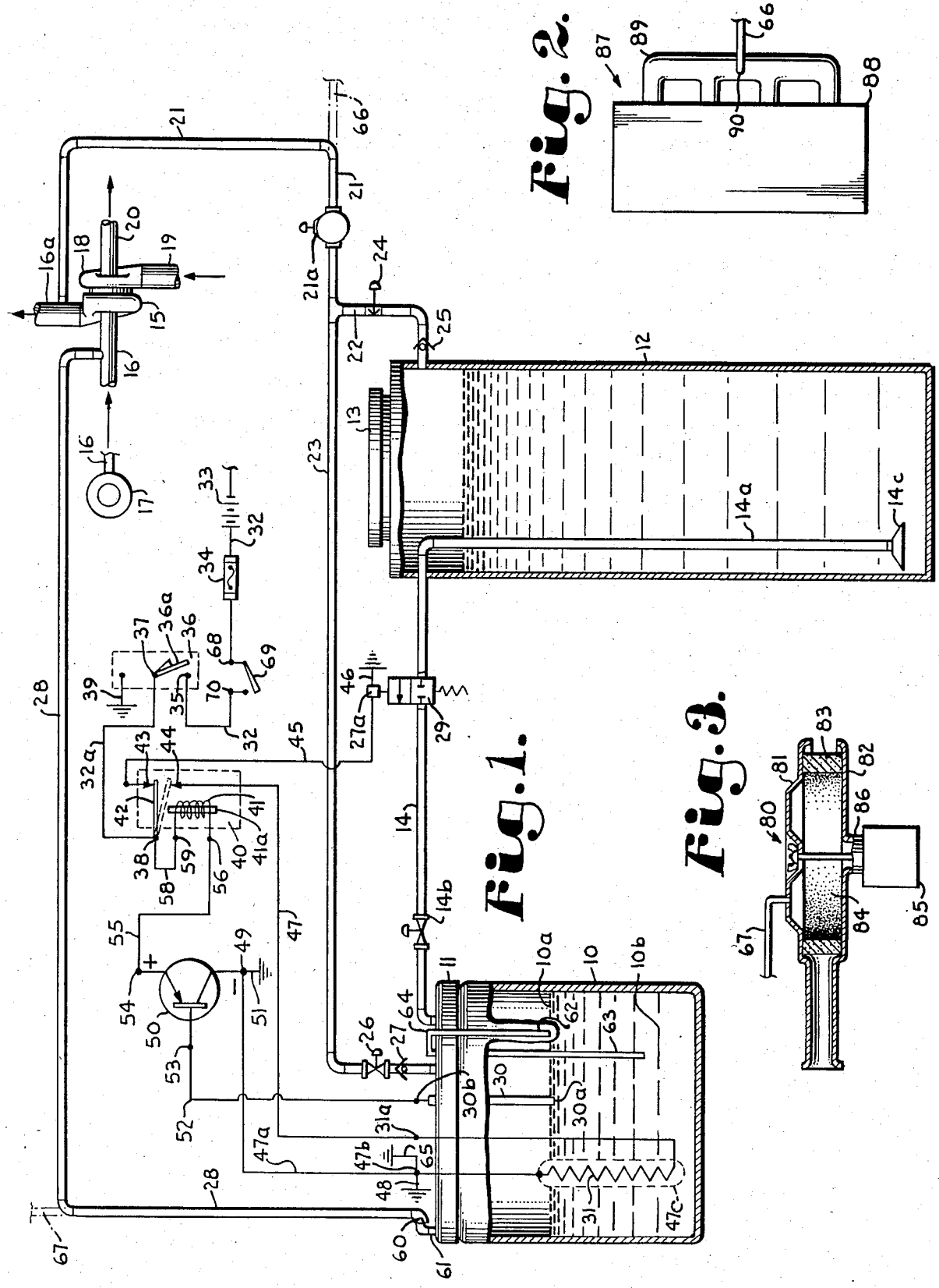

VAPOR INJECTION DEVICE

BACKGROUND OF THE INVENTION

The subject system utilizes a combination of well documented principles of operation in a novel manner, the system being highly effective in the modification and control of the fuel/air combustion process of internal combustion engines. The subject improvement does not alter the design of the basic engine although it does reduce the need for external exhaust treatment devices for control of emissions. The system does provide for a cooler running engine, increased gas mileage (improved fuel economy), increased engine torque, reduction of objectionable emissions, increased engine performance, substantial elimination of ping and knock, and, finally, reduced carbon buildup.

With respect to the combustion process in internal combustion engines, certain remarks will be made herebelow about the way a hydrocarbon fuel burns in an internal combustion engine, as well as the effect the fuel/air ratio has on the three main atmospheric contaminants discharged by such engine. These are limited by federal law and include CO (Carbon Monoxide), HC (unburnt hydrocarbons) and NOX (oxides of nitrogen).

For various reasons, a "chemically correct" mixture of fuel and air does not always get the best results by way of limiting contaminating exhaust emissions. Thus, ideally, for maximum power, the fuel/air mixture should be relatively richer, having a greater proportion of fuel. On the other hand, the fuel/air mixture should be leaner, utilizing less fuel than "chemically correct", for the best economy.

Unfortunately, most of the steps that can be taken to reduce the amounts of CO and HC also tend to increase the NOX emission, with some loss in economy. For example, running at moderately lean mixtures, that is, with some excess air, promotes complete combustion. This minimizes the amount of CO and HC developed, but it also increases the combustion temperature to the point that the nitrogen in the air becomes involved in the reaction, causing highly poisonous oxides of nitrogen to be generated.

Other factors and conditions can effect the internal combustion process, such as flame propagation throughout the explosive mixture, method of ignition, duration of ignition and turbulence, to name a few.

Of the named factors, turbulence is the most important. Upon turbulence depends the rate at which combustion takes place and efficiency of the combustion process. Turbulence is set up by the gases during their entry into the combustion chamber and, for rapid flame propagation, the fuel/air mixtures must be in a high rate of turbulence. If the combustion mixture were completely quiescent at the time of ignition, flame propagation would be so slow that, even in a slow speed engine, scarcely half of the fuel/air mixture would be burned before the exhaust valve open. Further, turbulence becomes more important as the density of the charge is latered by residual exhaust products. As the latter tend to be increased, they decrease the flame temperature and thereby retard the rate of flame propagation.

Further, during periods of severe engine operating conditions, such as high loading at slow speed or engine overheating, the combustion process can be further disrupted with very undesirable results. These combustion process undesirables are known as: pre-ignition, auto-ignition and detonation. These processes produce similar results, although they are caused by different actions. Of the three noted undesirable processes, detonation is the most undesirable and should be eliminated. It is the one responsible for drop in engine performance. Further, if detonation is to act in the engine for long periods, it may lead to engine damage.

Detonation is most noticeable at full throttle/slow speed operation. It occurs when the rise in temperature and pressure of the unburnt combustion gases are sufficient to produce auto-ignition. The increase in temperature in the unburnt mixture, often referred to as end-gas, is due to an additional amount of heat received by combustion and radiation from the approaching flame front. The increase in pressure is due to pressure waves transmitted at sonic speed from the burning section of the mixture. Further, when auto-ignition occurs, the burning is practically instantaneous and has the nature of an explosion. Simultaneously, very rapid pressure increases take place. These are responsible for shock waves which impinge upon the cylinder head and cylinder walls, producing the characteristic high pitch knocking sound.

At the present time, there are several methods used for the prevention of detonation. These include retarding the spark, using fuel with higher octane numbers or by the injection of the internal coolant such as water or water/alcohol solution.

Since early 1971, the automobile manufacturers of the United States have been required by law to reduce exhaust emissions, improve fuel economy and to increase performance in internal combustion engines. However, in order to accomplish these desired results, modification of the basic combustion process (as an alternative means for producing the three desired results) has received less attention than the addition of costly retrofit exhaust treatment devices such as thermal and/or catalytic oxidation of hydrocarbon and carbon monoxide in the engine exhaust system. Nitrogen oxide generation has been reduced to some extent through a combination of retarded spark ignition timing and exhaust gas recirculation, both factors serving to diminish the severity of the combustion process.

With respect to water injection, tests were carried out by a Mr. Benki, in Hungary, before 1900 and thereafter by numerous researchers both in this country and abroad. These tests showed that the use of the internal coolant such as water had the power to prevent pre-ignition and detonation. In the early days, detonation, especially, was a severe problem because of the low octane value of the fuel available and the trend toward increasing the compression ratio of engines to obtain higher efficiency.

In 1913, a professor B. Hopkinson, in England, carried out extensive tests with water as an internal coolant for horizontal gas engines. So successful was the method that Professor Hopkinson used, that he designed engines without water jackets, using internal cooling only. Oil engines designed in the middle 1920's, for tractor work, with hot bulb ignition, were commonly fitted with water injection equipment to prevent detonation.

Developments in super charged aircraft engines in the time interval from World War I and to the beginning of World War II brought water injection back to life. During World War II, water and water/alcohol injection were used to great success, particularly at take-off and during maximum flight speed.

After World War II water and water/alcohol injection experience was gained from such use as internal coolants for truck engines and tractor engines. During the period from 1944 to 1959 water injection was particularly researched by several universities in this country, England, Canada and Australia. More than 55 papers have been written on the subject.

With respect to water vapor, as opposed to water injection, per se, it was not until after World War II, when certain German technical documents were translated into English, that two researchers, while conducting combustion gas experiments had found, for example, that the combustion velocity of carbon monoxide and air mixtures increases from 6.3 inches/second for a dry mixture to about 21.6 inches/second for mixtures containing 9.4 percent water vapor. These investigators were Ubbelohde and Dommer, reporting in Gas U. Wasserfach 1914. Other researchers in Germany verified these facts and carried tests further in which they found and reported that the combustion velocity of carbon monoxide was not only accelerated by water vapor but also by hydrogen, as well as organic compounds containing hydrogen. This was interpreted as a sign that OH radicals and perhaps H-atoms participated in the reaction. Their presence would in themselves accelerate the reaction, as well as also increase the combustion velocity indirectly by diffusing very rapidly. (K. Bunte and associates in Gas U. Wasserfach 1932)

Other research papers substantiate the influence water vapor has on turbulence, flame propagation and flame velocity.

B. W. Bradford reported in J. Chem Society 1933, P.73 that catalytic combustion of CO on quartz surfaces is inhibited by liquid water, whereas the gas reaction is greatly accelerated by water vapor.

From the above background, it became apparent to the applicant that water vapor, when properly introduced and mixed in fuel/air mixtures, for combustion, in internal combustion engines would be the ideal internal coolant. This would be not only for increased engine performance, but also for fuel economy and limiting the generation of and discharge of the three main atmospheric contaminants. Specifically, carbon monoxide, unburnt hydrocarbons and oxides of nitrogen.

BRIEF DESCRIPTION OF THE INVENTION

For use in a vehicle engine system that has a turbo air compressor driven by the engine exhaust system hot gases on the air intake line running from the air cleaner to the engine intake manifold, the subject improvement comprises the following.

(1) There is first a vapor generating container holding a first quantity of water based liquid.

(2) There is secondly a water reservoir container holding a second quantity of water based liquid.

(3) There is a liquid transfer line from the lower portion of the reservoir container to the generating container.

(4) A vapor supply line runs from the upper portion of the said generating container to the air intake line running from the air cleaner to the turbo compressor.

(5) An air pressurization line air is supplied from the turbo compressor output, such line being divided so as to run, first, to the upper portion of the reservoir container and, second, to the upper portion of the generating container.

(5a) Flow control valves are provided on said last two divided lines, optionally a pressure regulator valve therebefore.

(6) A first solenoid valve control is supplied on the liquid transfer line between the water reservoir container and the vapor generating container.

(6a) A flow control valve is also preferably supplied on the last said liquid transfer line.

(7) A sensor is provided in the vapor generating container for determining when the liquid level therein falls below a predetermined position in order to enable the replenishment of liquid, as required, to the vapor generating container.

(8) Heating means are provided in said vapor generating container operative to heat the liquid therein to a temperature sufficient to generate substantially water particle free vapor therefrom, while not boiling the liquid therein.

(9) Means are provided for energizing the heater or heating means to generate said vapor when the vehicle engine is running.

(10a) Means are first provided coupled with said sensor for maintaining said heater energized and first solenoid valve control closed so long as the liquid level in the vapor generating container is above said predetermined level and in contact with said sensor thereby to generate sufficient vapor to substantially increase the humidity of the incoming atmospheric engine combustion air.

(10b) Means are further coupled with said sensor for shutting off said heater and opening said first solenoid valve control when said liquid level in the vapor generating container is below said predetermined level and out of contact with said sensor.

As a result, first, when said heater is generating vapor in said vapor generating container, air pressure through the air pressurization line forces vapor from said vapor generating vessel through said vapor supply line into said air intake line, while simultaneously continuously pressurizing the reservoir container.

Secondly, when said heater is shut off and the first solenoid valve control is open, air pressure through the air pressurization line and the first division thereof drives liquid from said reservoir container to said vapor generating container until said predetermined liquid level is again reached therein and the sensor contacted by the liquid. Then, the heater is reenergized and the first solenoid valve control closed. Air further is simultaneously and continuously provided to said vapor generating vessel to continue vapor transmission, if such is present. In any case, air flow into the air intake line through the vapor supply line takes place.

Increased output air pressure from the turbo compressor (caused by increase in turbine rpm caused by an increase in engine rpm) causes incresed flow of air through the air pressurization line to the vapor generator container to drive the vapor.

The subject improvement may also be used in an internal combustion engine system wherein there is available as a supplemental mental pressurized air source at least one of: a vehicle brake system, a pollution control air pump, an exhaust manifold pressure tap (preferable), an air horn supply system, an add-on compressor or the like. There must further be, in said internal combustion engine system, an air cleaner with a filter element therein, a carburetor associated therewith and an intake manifold following the carburetor supplying combustion air to the said engine to support the internal combustion operation thereof. Vapor in this system is supplied internally of the air cleaner filter element.

THE PRIOR ART

Applicant is aware of the following listed patents directed to steam, water or vapor injection into internal combustion engines:

Kelty U.S. Pat. No. 1,550,967 "Internal Combustion Engine", issued Aug. 25, 1925;

Steiner U.S. Pat. No. 2,189,022 "Gas Generator", issued Feb. 6, 1940;

Crozier et al U.S. Pat. No. 2,407,478 "Antiknock Or Detonation Dampening Device", issued Sept. 10, 1946;

Shultz U.S. Pat. No. 2,570,394 "Steam Induction Device For Manifolds", issued Oct. 9, 1951;

Crooks U.S. Pat. No. 3,141,293 "Method . . . For Refrigerating Combustion Air . . . ", issued July 21, 1964;

Berger U.S. Pat. No. 3,177,851 "Vapor Generating Appartatus", issued Apr. 13, 1965;

Manfredi U.S. Pat. No. 3,528,225 "Fluid Injecting Apparatus For Internal Combustion Engines", issued Sept. 15, 1970;

Herpin U.S. Pat. No. 3,537,434 "Vacuum Fuel Additive Inductor . . . ", issued Nov. 3, 1970;

Short et al U.S. Pat. No. 3,552,364 "Water Vapor Injector", issued Jan. 5, 1971;

Vizza U.S. Pat. No. 3,641,769 "Antipollution Carburetor Attachment", issued Feb. 15, 1972;

Mills U.S. Pat. No. 3,767,172 "Apparatus For Producing A Mist Of A Fluid", issued Oct. 23, 1973;

Harpman U.S. Pat. No. 3,968,775 "Fuel System For Internal Combustion Engines", issued July 13, 1976;

Whitt U.S. Pat. No. 4,005,683 "Energy Conversion Device", issued Feb. 1, 1977;

Corpus "Vapor Injector . . . " U.S. Pat. No. 4,030,456, issued June 21, 1977;

Perry U.S. Pat. No. 4,046,119 "Water Vapor Injection System . . . ", issued Sept. 6, 1977;

Penland U.S. Pat. No. 4,080,936 "Engine Moisture Induction System, issued Mar. 28, 1978;

Harpman et al U.S. Pat. No. 4,114,566 "Hot Fuel Gas Generator", issued Sept. 19, 1978;

Hart U.S. Pat. No. 4,208,989 "Water Vapor Injection System", issued June 24, 1980;

Fishe U.S. Pat. No. 4,281,626 "Vaporizable Liquid Injection System . . . ", issued Aug. 4, 1981; and Lohberg U.S. Pat. No. 4,337,731 "Feed System For Introducing Water Vapor . . . ", issued July 6, 1982.

OBJECTS OF THE INVENTION

A first object of the invention is to provide a charge-air humidification system for a turbocharged diesel engine, said system positioned in the engine compartment where it vaporizes a small quantity of water at a time, the water vapor being introduced into the charge-air supply duct, downstream from the air cleaner whereby, as the water vapor is added, the charge-air is continuously cooled in the process, also reducing the heat stress on the turbo-compressor.

Another object of the invention is to provide an air humidification system for internal combustion engines utilizing features which are highly effective in modification and control of combustion chamber pressure and temperature, thus lessening overall engine stress without altering the basic design for improved engine performance.

Another object of the invention is to provide a reactor system for use on diesel powered, turbo-charged, over the road truck engines which, through extensive road tests, have shown absolutely no adverse effects to any engine component whatsoever; further results of such tests showing that oil and fuel useage were reduced along with engine temperature and pressure. Yet further, exhaust smoke density was also reduced along with less early "down shifting" required with no loss of driveability.

Another object of the invention is to provide a system effectively utilizing the phenomenal characteristic of water vapor (a gas) to rapidly diffuse throughout the combustion fuel/air mixture, within the combustion chamber, thus resulting in economical fuel useage by increasing turbulence, flame propagation and flame velocity, while simultaneously limiting the generation and discharge of carbon monoxide (CO), unburnt hydrocarbons (HC) and oxides of nitrogen (NOX) because of the cooling effect provided by the water vapor.

Another object of the invention is to provide a system as described which, while specifically designed to operate with turbo charged diesel engines, can be adapted to operate with normally aspirated diesel or gasonline engines by the addition of a small air pressure pump or the equivalent.

Another object of the invention is to provide a system and method of properly introducing and mixing water vapor into fuel/air mixtures, for combustion in internal combustion engines, in such a way as to operate as the ideal internal coolant.

Another object of the invention is to provide methods of and apparatus for so introducing and mixing water vapor into fuel/air mixtures for combustion that such not only increases engine performance, but also fuel economy and limitation of the generation of and discharge of the three main atmospheric contaminants, specifically, carbon monoxide, unburnt hydrocarbons and the oxides of nitrogen.

Another object of the invention is to provide such a system which is air pressure operated, not vacuum operated, the air flow typically being between 0.15 cfm and 0.30 cfm, while the air pressure is kept in the range between seven inches of water and twenty inches of water.

Another object of the invention is to provide such a system where the generated vapors are introduced into the combustion air stream intake between the air cleaner and the carburetor on gasoline engines and between the air cleaner and the intake manifold on diesel engines.

Still another object of the invention is to provide such a system where air flow for introducing vapor into a combustion (ignition type) air stream for gasoline combustion engines is provided by an air pump or its equivalent. For diesel (or pressure ignition) engines, the air flow is by air pump for naturally aspirated engines and by a tap to the discharge of the compressor outlet on turbo charged diesel engines.

Another object of the invention is to provide such systems where the water level in the vapor generator vessel is controlled by a water sensor through a processor or transistor arrangement, without floats.

Still another object of the invention is to provide such a system wherein the electrical heater in the vapor generator is also controlled through a micro-processor or transistor and by the water level sensor, that is, as the water level drops the heater shuts off and only comes back on when the water level is restored. The heater will remain off if the water stays low or the vessel is empty.

Another object of the invention is to provide a guard or check against automatic vapor generator overflow in that, if there is a malfunction of the water solenoid valve (fails open), the water would be siphoned out of the generator vessel, thus preventing liquid water from entering the engine and preventing damage to said engine.

Still another object is to provide a vapor generator which operates below boiling and no steam is produced.

Yet further objects of the subject system are its capacity to provide (1) a cooler engine, (2) increased mileage, (3) increased engine torque, (4) reduced emissions, (5) increased performance, (6) elimination of ping and knock and (7) reduced carbon buildup.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 1 is a flow diagram of the subject system applied into a turbo charged diesel engine. (Additional attachments are shown whereby this system can be changed to work with the regular diesel or regular gasoline engine.)

FIG. 2 is a fragmentary schematic of part of a vehicle engine showing the exhaust manifold connection for use of the system with a regular gasoline engine.

FIG. 3 is a side section of a gasoline engine air cleaner with the subject system vapor input connection thereto.

FIG. 1 CONSTRUCTION

Referring to FIG. 1, at 10 there is seen a vapor generating container or vessel which is typically, but not necessarily, cylindrical. Vessel 10 has a removable top 11 through which various fittings and connections are made as will be later described. At 12 there is seen a water reservoir container or vessel having a top 13 which is removable for filling and cleaning purposes. Liquid transfer line 14 connects through the top of generating container 10 and extends, as at 14a, close to the bottom of reservoir container 12. Needle or flow control valve 14b is positioned on line 14 after solenoid valve 29.

This system is mounted and operative with respect to a vehicle engine system having a turbo air compressor 15 on the air intake line 16 leading from air cleaner 17 and passing to the engine intake manifold (not seen) via line 16a. Turbine 18 is itself driven and drives compressor 15 from engine exhaust gases supplied through line 19 and exhausted through line 20. A take-off line 21 from air intake line 16a receives air from the compressor 15 output line 16a. Line 21 divides into lines 22 and 23. Line 22 runs to the top of reservoir container 12 or near the top thereof. Needle valve 24, to control the air flow and pressure therethrough, is provided on line 22 and is followed thereon, in the direction of air flow, by disc check valve 25. Line 23 passes to and through the top 11 of generator vessel 10 and has needle valve 26 thereon to control the amount of air flow and pressure therethrough. Following needle valve 26 on line 23 is optional check valve 27. PRV 21a master regulates pressure.

Vapor supply line 28 passes from riser 61 and hose barb 60 out of the top 11 of generator vessel 10 approximately one half inch or more to connect with air intake line 16 before compressor 15. Solenoid valve 29 is provided on line 14 between vessels 10 and 12. Sensor 30 is provided through the top 11 of generating vessel 10 and operates to sense the water level in generator vessel 10. Heater 31 is provided within vessel 10.

Turning to the upper center of FIG. 1, electrical power supply line 32 runs from 12 volt battery 33 of the vehicle through circuit breaker 34 to terminal 68 of ignition switch 69. The other terminal 70 of switch 69 is connected by line 32 to terminal 35 of optional manual switch 36. From the other terminal 37, the power supply line 32a runs to terminal 38 on arm 42 of relay 40. Switch 36 has arm or armature 36a for connecting and disconnecting terminals 35 and 37 and is grounded at 39. Relay 40 has coil 41 and armature 41a therein which, when energized, pulls arm 42 from connection with terminal 43 (position shown in full lines) to contact with terminal 44 (dotted line position of arm 42).

From terminal 43, line 45 passes to coil 29a of valve 29, the former being grounded at 46. Line 47, from terminal 44, through terminal 31a, passes to one side of heater 31. Line 47a, grounded at 48, passes from the other side of heater 31 to the collector terminal 49, the negative or minus terminal of transistor 50. Collector terminal 49 is grounded at 51. Line 52 from sensor terminal 30b passes to base terminal 53 of transistor 50. The emitter or positive terminal 54 is connected to line 55 which runs to a first terminal 56 of relay coil 41. Line 58 connects second coil terminal 59 to terminal 38 which has arm 42 thereon.

Vapor supply line 28, at vapor generating vessel 10, is connected to hose barb 60 on riser or pipe 61 from cap 11 of vessel 10. Siphon tube 62, external of vessel 10, has internal arm or leg 63. The overhead junction 64 between legs 62 and 63 is positioned lower than hose barb 60 on riser 61. Vehicle ground 65 may additionally be provided in addition to ground 48.

The particular diagram of FIG. 1, as described, is directed to a system useable with a diesel or gas turbocharged engine. In the case of a normal gasoline internal combustion engine, line 66, joining line 21 before line 22 may be provided connected to an air source as will be described. The turbo compressor system shown in the upper right corner of FIG. 1 would not be present. Additionally, line 67 may be provided connected to line 28. Line 67 would go to the air cleaner (center thereof) of a gasoline engine, just above the carburetor, as will be described.

OPERATION FIG. 1

The engine of the vehicle is started and idling. Start is accomplished through ignition switch 69 on line 32. Optional manual switch 36, if present, must be on. At idle, there is generated from 0.22 to 0.32 psi of air pressure by compressor 15 into air pressurization line 21. Line 22 thereby pressurizes (from air pressure in line 21) reservoir 12 and throttled through valve 21a and 24 and check valve 25. Valve 29 is closed at this point, thus keeping the pressure on and in reservoir tank 12. Simultaneously, additional air continuously passes from line 21 into line 23, throttled through valves 21a and 26, thus passing to and into generator vessel 10. From vessel 10, this air vents into line 28 through hose 61 and hose barb 60.

Assuming the water level in generator vessel 10 at 10a, sufficient to wet the lower tip of sensor 30, with switches 69 and 36 being on, relay 40 is energized and switch contact arm 42 pulled down to contact terminal 44. This energizes heater 31. With heater 31 on, vapor is generated in vessel 10 whereby a relatively small amount of vapor (because of the idling state of the engine) is supplied to the compressor intake line 16 following air cleaner 17. This vapor somewhat humidifies the intake air through compressor 15 into the intake manifold via line 16a. Compressor 15 is driven by turbine 18, itself driven by exhaust gases from the engines through line or pipe 19.

Assuming that the engine stays on idle, but the water level 10a in generator vessel 10 drops below the lower tip of sensor 30, the following occurs. From sensor 30, the circuit is broken to the coil 41 of relay 40 and switch arm 42 returns to contact with terminal 43. That is, when the water level drops, sensor 30, through transistor 50, deenergizes the relay coil 41, causing arm 42 to rise and contact terminal 43.

This action shuts off current flow to heater 31. Simultaneously, solenoid valve 29 is energized to open, thus opening line 14 so that water from reservoir tank 12 may be forced by built up air pressure in said reservoir 12 through lines 14a, 14 to generator vessel 10. Valve 14b prevents excessive surge of water through line 14 from vessel 12 to vessel 10.

Then, after the level of water again rises to contact the lower tip of sensor 30, the relay coil 41 is again energized through transistor 50 and switch arm 42 returns to contact 44, thus energizing heater 31 and closing valve 29 on line 14.

With respect to acceleration operation, increase in air intake through line 19, as the engine accelerates, speeds up turbine 18, thus driving compressor 15 at a higher rate. This forces more air into a line 21. Pressure in lines 21 and 22 into reservoir vessel 12 is regulated by valves 21a and 24. Pressurization into reservoir vessel 12 is typically limited to a maximum of 20 inches of water. The check valve 25 on line 22 after needle valve 24 (which is a disc check valve) maintains the pressure in the reservoir by closing after the pressure build up in the reservoir 12 equals incoming pressure.

So long as the sensor tip 30a is submerged in generator vessel 10, valve 29 is maintained closed and no water is forced through line 14. Thus reservoir vessel 12 remains pressurized at all times, but no water goes across until valve 29 is open. Also, so long as the sensor tip is emerged, the heater is energized and vapor is generated in vessel 10. Accordingly, all the air from line 21, once reservoir vessel 12 is pressurized, passes through line 23, controlled by needle valve 26. This air operates to drive vapor generated by the operating valve 31 into line 28 through fittings 61, 60 and thus into intake line 16, carrying air to the engine. Regulator valves 21a typically limits pressurization into generator vessel 10 to a maximum of 20 inches of water. If check valve 27 is employed between needle valve 26 and vessel 10, it operates to prevent backup of water into line 23.

The function of siphon 62, 63, 64 is to prevent any possibility of water getting into the engine. This contingency might happen if valve 29 malfunctioned open. If this were the case, because the height of the top arm 64 of siphon 62–64 inclusive is below that of hose barb 60, before water would rise the full height of pipe 61 and get into line 28, it would siphon over and out of the vessel 10. In this way, the entire contents of both vessel 10 and reservoir 12 could be siphoned out if, through malfunction, valve 29 remained open.

STARTUP FROM LOW WATER IN GENERATOR VESSEL 10

When startup is initiated in the subject system with water level 10a below the sensor lower tip (30) in generator vessel 10, yet with reserve water within reservoir vessel 12, the following happens:

(1) Relay 40 is on standby without coil 41 energized. When the ignition is turned on at 69, 70 and switch 36a activated (if present), power is applied to the circuit from battery 33 through terminal 43 to solenoid water valve 29. Air pressurization from compressor 15 (or separate air supply in the case of a nonturbo charged engine) forces water through line 14 into generator vessel from reservoir vessel 12, thus starting to fill generator vessel 10 (if empty) or replenish the level therewithin.

(2) When the water in generator vessel 10 reaches the level of the tip 30a of sensor 30, the transistor 50 actuates the relay coil 41 and arm 42 moves to contact 44. This breaks the circuit to the solenoid water valve 29, cycling it closed and simultaneously closing the circuit to heater 31, thus causing it to start generating vapor in vessel 10.

(3) Presence of sufficient liquid in generating vessel 10 to continue to wet the tip 30a of sensor 30 maintains the relay coil 41 activated with arm 42 held in contact with terminal 44 with water valve 29 closed and heater 31 activated. When the level of water drops out of contact with the lower end of the sensor tip, via transistor 50, the relay coil 41 activation is terminated, thus permitting arm 42 to return to contact 43. In this case, first, heater 31 does not work and, secondly, the solenoid water valve 29 is cycled open so that the constant air pressurization of vessel 12 refills, through line 14, generator vessel 10 from reservoir vessel 12.

FIGS. 2 AND 3

FIG. 3 is a side sectional view of an air cleaner of conventional sort for a gasoline internal combustion engine, such here numbered 80 in general, 81 in the top portion thereof, 82 in the lower portion thereof, 83 in the cylindrical filter element thereof and 84 in the internal portion thereof interior of filter element 83. Air cleaner 80 is mounted over carburetor 85 and furnishes filtered air thereto to pass into the intake manifold and thus to the cylinders of the engine. Line 67 enters the top 81 of air cleaner 80 internally of filter 83. Thus, vapor is supplied to air cleaner 80 internally of filter element 83 whereby the air being passed through lower throat 86 of the air cleaner into carburetor 85 is humidified by the vapor produced in the system just described.

FIG. 2 is a top plan view of a four cylinder automobile engine of ordinary gas type (not turbo charged) which is generally designated 87. The engine block 88 has exhaust manifold 89 thereon from which runs line 66 from tap 90.

Referring back to FIG. 1, in the right center of the view, there is the line 66, shown in dotted lines, which is the line tapped off the exhaust manifold 89 of a normal gasoline engine 87. In the upper left hand corner of FIG. 1, in dotted lines, there is shown line 67 taken off from line 28. This is the line that leads to air cleaner 80 in FIG. 2.

The point of FIGS. 2 and 3 and lines 66 and 67 are to show how the precise system of FIG. 1 may be adapted to a gasoline engine (non turbo charged) or normal diesel engine (non turbo charged). In such case, referring to FIG. 1, all of the horizontal portion of line 28 would be removed, as well as elements 15, 16, 17, 18, 19, 20 and line 21 down to line 66. In short, the whole turbo charged system extending form line 67 to line 66 would be removed. On the other hand, that portion of line 21 after the connection of line 66 would remain, going to the division of line 21 into lines 22 and 23. Also, with respect to 67, all of line 28 between element 60 and line 67 would remain.

Thus it may be seen that, in the specific system described, gases from the exhaust manifold 89 would pass out tap 90 into line 66 and thence into the continuation of line 21. These gases would divide between lines 22 and 23, pressure controlled by regulator valve 21a and air flow controlled by needle valves 24 and 26 in the same manner as described for gases coming from the tap on line 16a. The gases in line 22 through valves 24 and 25 pressurize reservoir 12. The gases in line 23 through valves 26 and 27, if present, move vapor from above the water level 10a in vessel 10 out riser 61, into line 28 and thence into line 67. The vapor from line 67 passes into the annulus inside filter element 83 of air cleaner 80, thence through throat 86 of air cleaner 80 and thus into carburetor 85. From carburetor 85, the humidified gases go into the intake manifold and thence to the cylinder combustion chambers.

When the source of gases to line 66 is an internal combustion chamber as at 88 with a tap 90 from the exhaust manifold 89 thereof, then the function of the system is similar to that described with respect to the FIG. 1 system in that there are different quantities of gases provided through line 66 from idle of the engine, acceleration of the engine and various speeds of the engine 87. This is not the case when a source of air for line 66 is a vehicle air brake system, a pollution control air pump, an air horn supply system, an add-on compressor or the like. The latter sources provide a more continuous flow of vapor from more constant flows of air. The vapor is less needed in idling situations and more needed in acceleration which conditions are better served by the two preferred variable air flow systems.

In case of consumption depletion of water from the system including reservoir 12 the heater 31 remains off while valve 29 which has continuous duty operating coil 29a, remains open.

The presence of the pressure regulating valve 21a will regulate pressure to lines 22 and 23 and reduce pressure control requirements in needle valves 24 and 26.

ELECTRICAL PROCESS

The action of the vapor generating process shown in the electrical and pneumatic flow schematic diagram of FIG. 1 is as follows:

(1) After starting the engine through the ignition switch 69 and (optional) manual (on-off) rocker switch 36a (should be in on position), such action applies a 12 volt DC voltage through the normally closed contact 43 and armature 42 of relay 40, thus energizing solenoid coil 29a of solenoid water valve 29. This is through line 45, with line 46 to ground, operative to cause water flow through valve 29 and lines 14a and 14 from reservoir 12 to vapor generator 10. This fills vapor generating vessel 10 to the desired level 10a.

(2) The 12 volt DC voltage is obtained from battery 33 followed by circuit breaker 34 through lines 32 and 32a.

(3) The water level 10a in vapor generating vessel 10 is determined by the length of the sensor 30 and the tip 30a thereof, as well as by the PNP transistor 50.

(4) When the water level 10a in vessel 10 makes contact with sensor tip 30a, a low current flow through the PNP transistor 50 is initiated. This energizes relay coil 41 of relay 40 which, in turn, causes armature 42 to make contact with terminal 44. This deenergizes solenoid coil 29a through line 45 which also results in the closing of water valve 29. Simultaneously, heater 31 is actuated through line 47 by way of terminals 44 and 31a. Lines 48 and 65 are connected to terminal 47b to ground the heater. Metal shield 47c is also grounded to terminal 47b.

(5) The function of the transistor 50 is to control the water level 10a and the off and on action of the heater 31 located in the vapor generating vessel 10.

(6) The PNP type transistor 50 has three terminals, namely the emitter 54 or plus terminal, the collector 49 or minus terminal and the base 53 terminal. (In a PNP transistor control current flows from emitter to base, in the direction of the arrow. Working current flows from emitter to collector.)

(7) The connections of the transistor 50 are made to control the relay 40 which is connected to the 12 volt DC power source at 33 through lines 32a and 58, as well as terminals 56 and 59.

(8) The connections of the transistor 50 in the relay 40 control circuit are as follows:

(a) The emitter terminal 54 is connected to the relay coil 41 through line 55 and relay coil terminal 56.

(b) The collector terminal 49 is connected to minus or ground through line 51.

(c) Heater 31 and heater terminal 47b are connected to collector terminal 49 by line 47a and the heater terminal 47b is grounded by lines 48 and 65.

(d) The base terminal 53 is connected to sensor 30 at sensor terminal 30b through line 52 which completes the electrical circuit to the transistor 50.

(Water level completes current flow from base terminal to ground through metal shield 47c. The water 10b in the vapor generating vessel is a conductive medium between the collector 49 and the base 53 of the transistor 50, thus providing the switching function required to maintain the desired water level 10a and to control the off-on function of heater 31.)

(9) As the heater 51 vaporizes water 10b in the generator vessel 10 and water level 10a drops below the sensor tip 30a, low current flow terminates through the transistor 50 which results in the deactivation or deenergizing of the relay coil 41.

(10) This latter action again causes armature 42 to return to make contact with terminal 43, to energize solenoid coil 29a and open water valve 29. This starts the filling of vapor generating vessel 10 to the desired level 10a with water 10b. (14c is a filter.)

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In a vehicle engine system having a turbo air compressor (driven by the engine exhaust system hot gases) on the air intake line running from the air cleaner to the engine intake manifold, the improvement which comprises:
   (1) a vapor generating container holding a first quantity of water based liquid;
   (2) a water reservoir container holding a second quantity of water based liquid;
   (3) a liquid transfer line from the lower portion of the reservoir container to the generating container;
   (4) a vapor supply line from the upper portion of the generating container to the air intake line between the air cleaner and turbo compressor;
   (5) an air pressurization line from the turbo compressor output, this line being divided into a first air line to the upper portion of the reservoir container and a second air line to the upper portion of the generating container;
   (6) first and second valve controls on the liquid transfer line between the two said containers;
   (7) a presure regulator valve on the air pressurization line from the turbo compressor output, a needle valve and a following disc check valve on the first air line from the air pressurization line to the upper portion of the reservoir container and a needle valve on the second air line from the air pressurization line to the generating container;
   (8) a sensor in the vapor generating container for determining when the liquid level therein falls below a predetermined position to enable the provision of replenishment of liquid, as required, to the vapor generating container;
   (9) heating or heater means in said generating container for heating the liquid therein to a temperature sufficient to generate substantially water particle free vapor therefrom, yet not boil the liquid;
   (10) means for energizing the heating means to generate said vapor when the vehicle engine is running;
   (11) means coupled with said sensor for:
      (a) maintaining said heater energized and the first valve control closed so long as the liquid level in the generating container is above said predetermined level and in contact with said sensor to generate sufficient vapor to substantially increase the humidity of the incoming atmospheric engine combustion air, and
      (b) shutting off said heater and opening said first valve control when said liquid level in the generating container is below said predetermined level and out of contact with said sensor;
   whereby, first, when said heater is generating vapor in said generating container, air pressure through the second air line continuously forces vapor from said generating vessel through said vapor supply line into said air intake line and air pressure through the first air line simultaneously continuously pressurizes the reservoir container;
   second, when said heater is shut off and the first valve control is opened, air pressure through said first air line drives liquid from said reservoir container to said generating container until said predetermined level is again reached, the sensor contacted, the heater is reenergized and the first valve control closed,
   air further simultaneously and continuously being provided to said generating vessel through said second air line to continue vapor transmission, if such is present and, in any case, air flow into the air intake line through the vapor supply line,
   increased output air pressure from the turbo compressor (caused by increase in turbine rpm caused by an increase in engine rpm) causing increased flow of air through the air pressurization line and second air line to the generator container.

2. A system as in claim 1 wherein said generating vessel has a siphon relief coupled therewith.

3. A system as in claim 1 wherein the vehicle engine system has spark ignition.

4. A system as in claim 1 wherein the vehicle engine system has pressure ignition.

5. In an internal combustion engine system wherein there is available as a supplemental pressurized air source at least one of: a vehicle air brake system, a pollution control air pump, an exhaust manifold pressure tap, an air horn supply system, an add-on compressor or the like, there further being associated with said system an air cleaner with a filter element therein, a carburetor associated therewith and an intake manifold following the carburetor supplying combustion air to the said engine to support the internal combustion operation thereof,
   (1) a vapor generating container holding a first quantity of water based liquid;
   (2) a water reservoir container holding a second quantity of water based liquid;
   (3) a liquid transfer line from the lower portion of the reservoir container to the generating container;
   (4) a vapor supply line from the upper portion of the generating container to the air cleaner housing interior of the air cleaner filter element and before the carburetor;
   (5) an air pressurization line from the said supplemental pressurized air source dividing into two separate air lines, a first air line to the upper portion of the reservoir vessel and a second air line to upper portion of the generating vessel;
   (6) first and second valve controls on the liquid transfer line between the two said containers;
   (7) a pressure regulator valve on the air pressurization line from the supplemental pressurized air source, a needle valve and a following disc check valve on the first air line from the air pressurization line to the upper portion of the reservoir container and a needle valve on the second air line from the air pressurization line to the generating container;
   (8) a sensor in the vapor generating container for determining when the liquid level therein falls below a predetermined level and replacement of liquid to the vapor generating container is required;
   (9) heating or heater means in said generating vessel for heating the liquid therein to a temperature sufficient to give substantial water particle free vapor generation therefrom, yet not boil the liquid;
   (10) means for energizing the heater to generate said vapor when the vehicle engine is running;
   (11) means coupled with said sensor for:

(a) maintaining said heater energized and the first valve control closed so long as the liquid level in the generating container is above said predetermined level in contact with said sensor to generate sufficient vapor to substantially increase the humidity of the incoming atmospheric engine combustion air, and (b) shutting off said heater and opening said first valve control when said liquid level in the generating container is below said predetermined level out of contact with said sensor;

whereby, first, when said heater is generating vapor in said generating vessel, air flow through the second air line continuously forces vapor from said generating vessel into said vapor supply line and second air pressure through the first air line simultaneously continuously pressurizes the reservoir vessel, second, when said heater is shut off and the first valve control is open, air pressure through said first air line drives liquid from said reservoir container into said generating container until said predetermined level is again reached, liquid contacts the sensor, the heater is reenergized and the first valve control closed, air further simultaneously and continuously being provided to said generating vessel through said second air line to continue the vapor transmission if such is present and, in any case, air flow to the vapor supply line.

6. A system as in claim 5 wherein the engine system has spark ignition.

7. A system as in claim 5 wherein the engine system has pressure ignition.

8. A system as in claim 5 wherein said generating vessel has a siphon relief coupled therewith.

* * * * *